(12) United States Patent
Satou

(10) Patent No.: US 6,497,136 B2
(45) Date of Patent: Dec. 24, 2002

(54) TRACE-LEVEL GAS ANALYSIS APPARATUS AND METHOD

(75) Inventor: Yuuichi Satou, Tokyo (JP)

(73) Assignee: NEC Corporation, Tokyo (JP)

( * ) Notice: Subject to any disclaimer, the term of this patent is extended or adjusted under 35 U.S.C. 154(b) by 35 days.

(21) Appl. No.: 09/774,609

(22) Filed: Feb. 1, 2001

(65) Prior Publication Data

US 2001/0011474 A1 Aug. 9, 2001

(30) Foreign Application Priority Data

Feb. 3, 2000 (JP) ........................................ 2000-026336

(51) Int. Cl.[7] ........................... G01N 31/08; G01N 30/96
(52) U.S. Cl. .................. 73/23.22; 73/23.41; 73/864.83; 422/88
(58) Field of Search .............................. 73/23.22, 23.41, 73/864.83, 864.84; 422/88, 93

(56) References Cited

U.S. PATENT DOCUMENTS

| | | | | |
|---|---|---|---|---|
| 3,926,561 A | * | 12/1975 | Lucero | 422/83 |
| 3,976,450 A | * | 8/1976 | Marcote et al. | 128/205.12 |
| 4,472,354 A | * | 9/1984 | Passell et al. | 210/298 |
| 5,205,988 A | * | 4/1993 | Tanaka et al. | 422/255 |
| 5,714,676 A | | 2/1998 | Hase | 73/23.41 |
| 5,841,022 A | | 11/1998 | Hase | 73/23.33 |

FOREIGN PATENT DOCUMENTS

| | | |
|---|---|---|
| JP | 6-11496 | 1/1994 |
| JP | 2751852 | 2/1998 |

* cited by examiner

*Primary Examiner*—Hezron Williams
*Assistant Examiner*—Michael Cygan
(74) *Attorney, Agent, or Firm*—Sughrue Mion, PLLC

(57) ABSTRACT

A trace-level gas analysis apparatus having a diffusion scrubber 11 that captures atmospheric gas components and a sampling tube 10 that guides air into the diffusion scrubber 11 is provided with the cleaning means 2 for cleaning the diffusion scrubber 11 and the sampling tube 10, using a cleaning fluid 22.

6 Claims, 7 Drawing Sheets

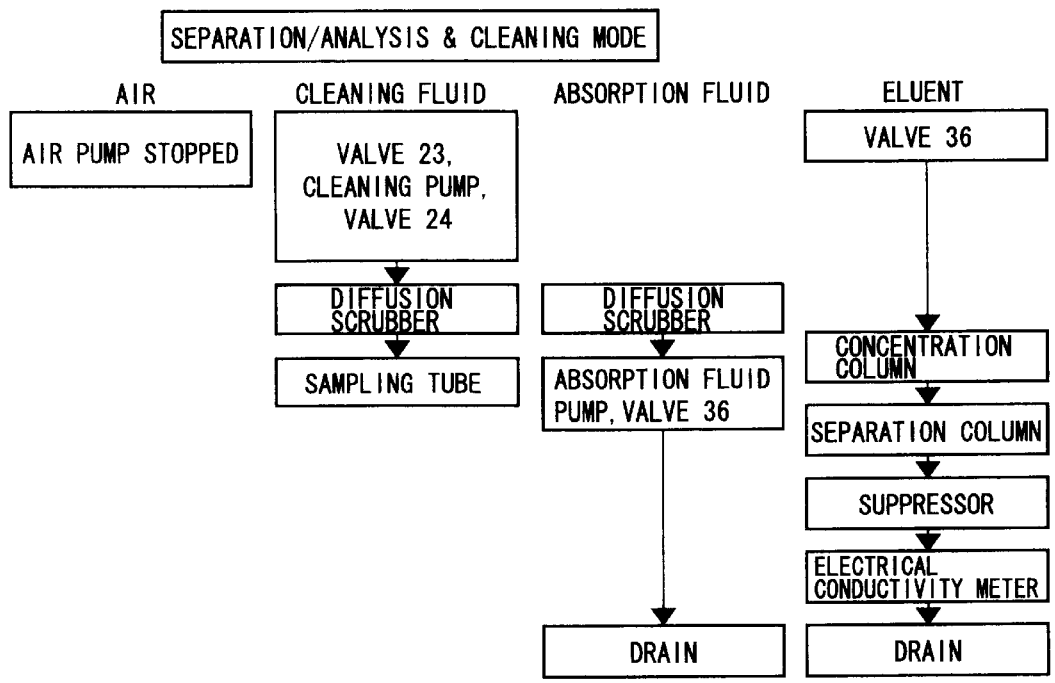
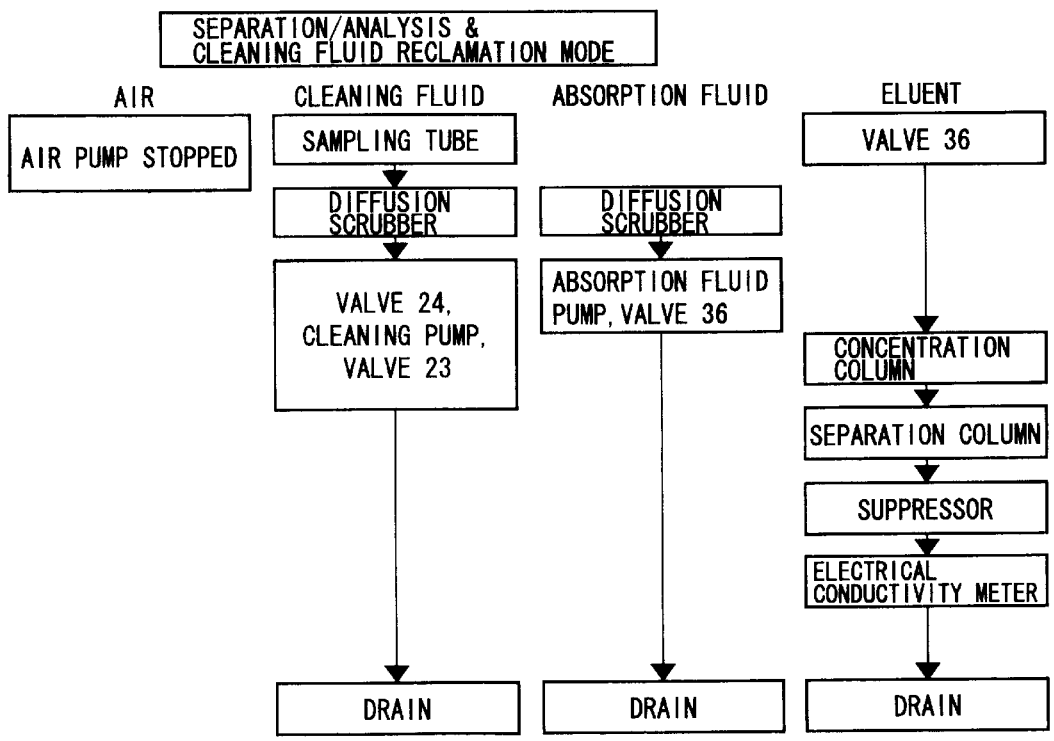

PRIOR ART

TRACE-LEVEL GAS ANALYSIS APPARATUS AND METHOD

BACKGROUND OF THE INVENTION

1. Field of the Invention

The present invention relates to an apparatus and a method for analysis of trace-level gases, and more particularly to an apparatus and method for trace-level gas analysis, which eliminates the memory effect and enables detection of trace-level gas contaminants with a high accuracy.

2. Related Art

In semiconductor manufacturing processes, cases in which trace-level gas contaminants cause manufacturing defects are on the increase. In order to stabilize the manufacturing process, dust/chemical filters are used to remove offending matter. However, because of accidents involving contamination of materials used within the manufacturing process and filter damage, there is a need to achieve automated, continuous measurement and monitoring of the trace-level gas contaminants within the air.

In measuring trace-level components in the past, methods such as the impinger method were used to concentrate a component of interest over a long period of time up to the lower detection limit of the analysis apparatus, with analysis and quantification then being performed using an analysis apparatus of the ion chromatograph type, for example. This approach, however, was accompanied by the problem of a long measurement interval and the inability to identify the overall quantity of contaminant occurring, and the problem of not being able to accommodate suddenly occurring trace-level gas contaminants of a high concentration.

An additional problem arose because of the memory effect (influence of a previous measurement) when the component of interest remains in the sampling system or concentration system after high-concentration measurement using automatic ammonia analysis with the diffusion scrubber method, thereby preventing high-accuracy measurement.

In the multipoint gas analysis apparatus provided with a cleaning function as shown in FIG. 9 of the accompanying drawings, a cleaning fluid 43 is used so as to clean the switcher 41 and a diffusion scrubber 45. In this method, each time the measurement point of the sampling tube 40 is switched, because the switcher 41 and the diffusion scrubber 45 are cleaned before the measurement, the method is effective in eliminating influence of the point A on the measurement at point B. If point A only is observed, however, in a case in which the concentration at this point A changes suddenly (for example, when a sudden change from a high concentration to a low concentration occurs), even though the switch 41 and the diffusion scrubber 45 having been cleaned immediately previously are in a clean condition, because of a gas component that remains attached to the inner wall of the sampling tube 40, it is not possible to achieve a high measurement accuracy.

Accordingly, it is an object of the present invention, in order to improve on the above-noted drawbacks of the prior art, to provide a trace-level gas analysis apparatus and method which eliminate the memory effect and enable detection of a trace-level gas contaminants with a high accuracy.

SUMMARY OF THE INVENTION

To achieve the above-noted objects, the present invention adopts the following basic technical constitution.

Specifically, a first aspect of the present invention is a trace-level gas analysis apparatus comprising: a diffusion scrubber for capturing an atmospheric gas component; a sampling tube for guiding the captured atmospheric gas component to the diffusion scrubber; and cleaning means for cleaning the diffusion scrubber and the sampling tube using a cleaning fluid.

In the second aspect of the present invention, the apparatus further comprising: a pump for introducing the cleaning fluid into the diffusion scrubber and sampling tube and discharging the cleaning fluid from the diffusion scrubber and the sampling tube; and a valve for guiding the cleaning fluid to the diffusion scrubber and the sampling-tube and draining out spent cleaning fluid therefrom.

In the third aspect of the present invention, the apparatus further comprising: a plurality of sampling tubes for capturing atmospheric gas components at a plurality of locations; and a switching valve disposed between the plurality of sampling tubes and the diffusion scrubber so as to select any one of the sampling tubes.

In the fourth aspect of the present invention, the cleaning fluid is ultra-pure water.

The first aspect of the method for analyzing trace-level gas components of the air, in which the air is guided to a diffusion scrubber via a sampling tube, an absorption fluid is introduced into the diffusion scrubber, the absorption fluid being concentrated by a concentration column of an ion chromatograph, thereby separating and analyzing the atmospheric trace-level gas components, the method comprising steps of: a first step of cleaning the diffusion scrubber and the sampling tube; a second step of reclaiming the cleaning fluid used in the first step; a third step of causing an absorption fluid to circulate within the diffusion scrubber so as to stabilize capturing in the diffusion scrubber; a fourth step of causing an absorption fluid to circulate between the diffusion scrubber and the concentration column, so as to concentrate the trace-level gas components in the concentration column; and a fifth step of analyzing components concentrated in the concentration column using an ion chromatograph.

The second aspect of the method of the present invention is that in the fifth step, the first step and second step are performed simultaneously.

In the present invention, as shown in FIG. 1 of the accompanying drawings, a sampling tube 10 installed at a remote measurement point is connected to a diffusion scrubber 11, and the atmosphere sucked in thereat is supplied to the diffusion scrubber 11. During capturing operation, a trace-level gas component in the atmosphere is captured by setting a passage switching valve 24 to the side of an air pump 14, so that air is sucked into the diffusion scrubber 11, the absorption fluid 16 being caused to absorb the gas component. The capture of the trace-level gas by the diffusion scrubber 11, which is known by such disclosures as the Japanese laid-open patent publication (KOKAI) No.8-54380, is done by passing an ammonia component and a mono-ethanol amine component also with other trace-level gas components through a porous fluoride-based film within the diffusion scrubber 11, so that they are absorbed by the absorption fluid 16 passing through the porous fluoride-based film. The gas components absorbed by the absorption fluid 16 are subjected to concentration conversion by individual gas component, using concentration column 32, a separation column 33, a suppressor 34, and an electrical conductivity meter 35 of an ion chromatograph 3. During the process of concentration, that is, after the completion of sampling, the passage switching valve 24 is set to the cleaning fluid 22 side, and ultra-pure water 22 used as the cleaning fluid is sent by a cleaning pump 21 to the inside of the diffusion scrubber 11 and the inside of the sampling tube 10. Then, the passage switching valve 23 is set to the drain side, so as to cause the cleaning pump 21 to rotate in reverse, thereby reclaiming the cleaning fluid that had filled the inside of the diffusion scrubber 11 and the inside of the sampling tube 10, this completing the cleaning.

The operation of the present invention comprises a repetition of a cycle made up of a cleaning operation, in which cleaning fluid is supplied to the diffusion scrubber 11 and the sampling tube 10, a preparatory operation, in which the air and an absorption fluid 16 are caused to flow in the diffusion scrubber 11 and a porous fluoride-based film is placed in a state of equilibrium, a sampling operation, in which a gas component absorbed in the diffusion scrubber 11 is supplied to the concentration column 32 and the trace-level gas component is concentrated in the concentration column 32 of the ion chromatograph, and a separation and analysis operation, in which components concentrated in the concentration column 32 in the sampling operation are separated into individual components by the ion chromatograph.

In the present invention, by providing the cleaning section 2, which uses ultra-pure water to clean the sampling tube 10 and the diffusion scrubber 11 of the capturing section 1, it is possible to reduce the memory effect from the previous measurement, thereby enabling highly accurate monitoring of concentration. Immediately after sampling of a high-concentration gas in particular, there was the problem in the past of a high-concentration gas component becoming attached to the sampling tube 10 and diffusion scrubber 11 of the capturing section 1, thereby resulting in values higher than the actual concentration value being detected. With the present invention, however, because of the ability to eliminate the memory effect existing in the past, it is possible to perform measurements with high accuracy.

BRIEF DESCRIPTION OF THE DRAWINGS

FIG. 5 is a drawing showing the condition of various parts of the present invention during the cleaning operation.

FIG. 6 is a drawing showing the condition of various parts of the present invention during cleaning fluid reclamation operation.

DETAILED DESCRIPTION OF THE PREFERRED EMBODIMENTS

Figure 1:
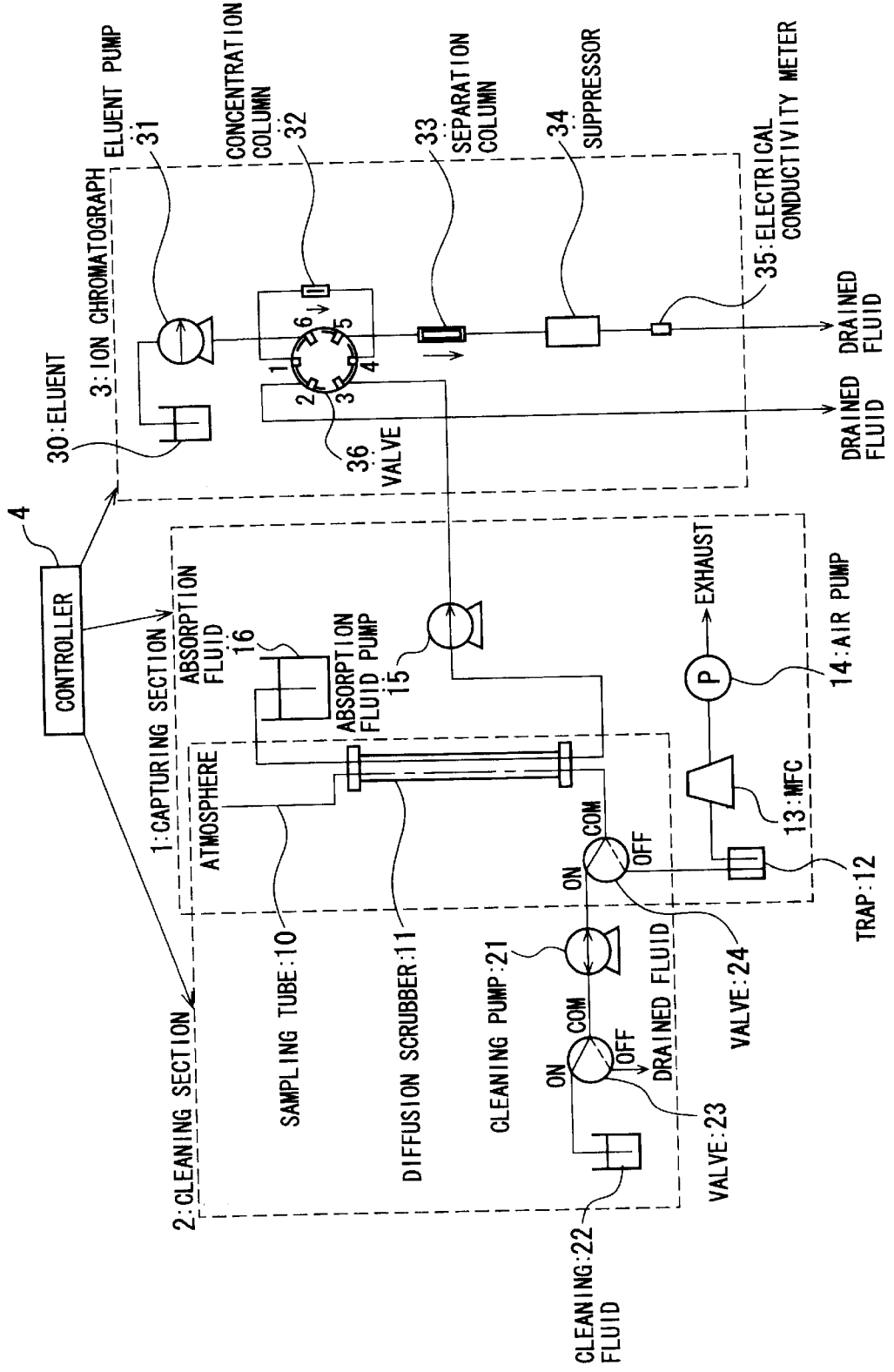
FIG. 1 is drawing showing the main part of the configuration of a trace-level gas analysis apparatus according to the present invention.

Embodiments of a trace-level gas analysis apparatus and a method therefor according to the present invention are described in detail below, with references made to relevant accompanying drawings.

First Embodiment

The first embodiment of a trace-level gas analysis apparatus and method is described below, with references being made to FIG. 1 to FIG. 7.

These drawings show a trace-level gas analysis apparatus minimally including a diffusion scrubber 11 for capturing an atmospheric gas component and a sampling tube 10 which guides air into the diffusion scrubber 11, this apparatus being provided with a cleaning means for cleaning the diffusion scrubber 11 and the sampling tube 10 using cleaning fluid 22.

The cleaning means 2 of this trace-level gas analysis apparatus has a pump 21 for the purpose of introducing the cleaning fluid 22 into the diffusion scrubber 11 and the sampling tube 10 and discharging the cleaning fluid 22 from the diffusion scrubber 11 and the sampling tube 10, and a valve 23 for the purpose of guiding the cleaning fluid 22 into the diffusion scrubber 11 and the sampling tube 10 and draining spent cleaning fluid therefrom.

The first embodiment of the present invention is described in further detail below.

Figure 2:
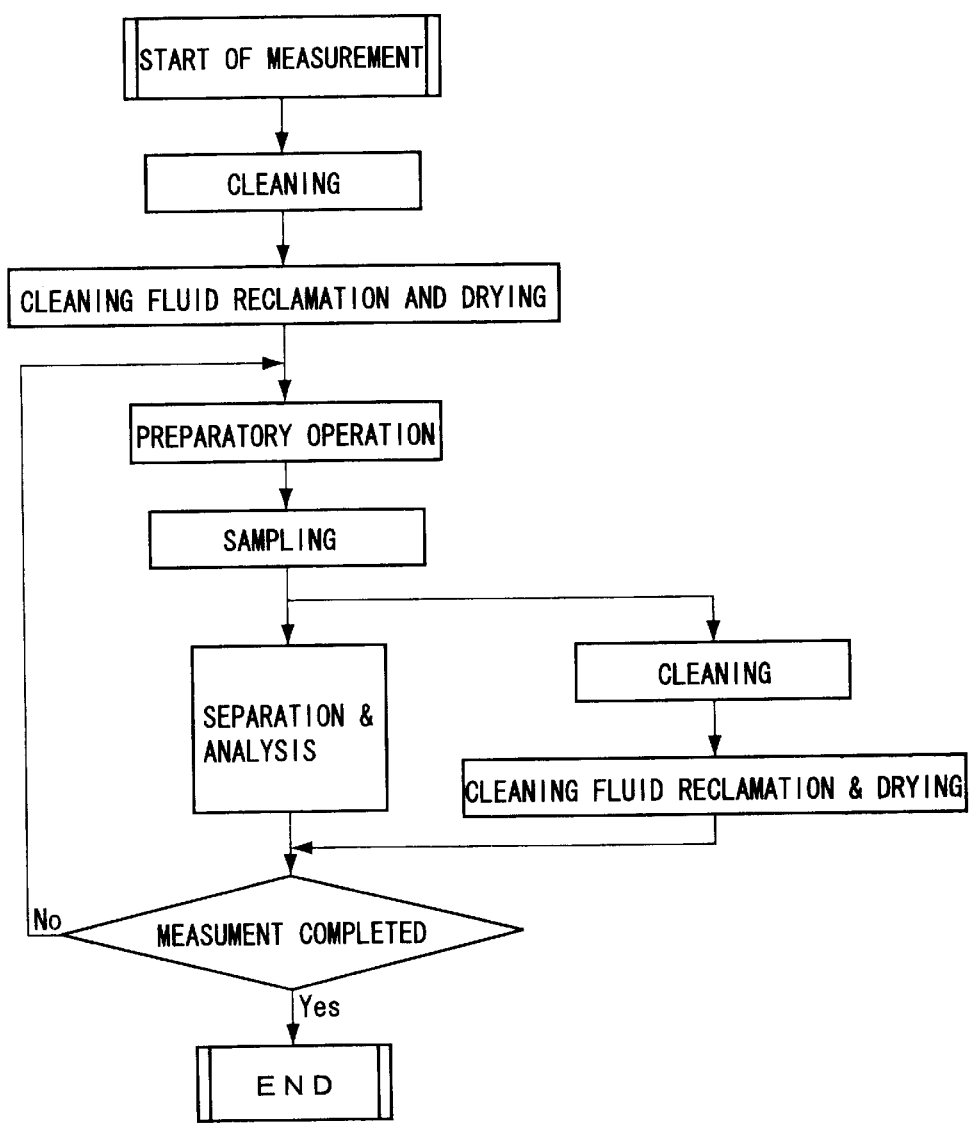
FIG. 2 is a flowchart showing the operational process in a trace-level gas analysis system according to the present invention.

An example of the present invention is shown by the basic piping interconnection drawing of FIG. 1 for the case of continuous measurement of an atmospheric trace-level gas, with FIG. 2 being a flowchart showing the operation conditions of this apparatus. The configuration of this trace-level gas analysis apparatus can be divided into the parts of a capturing section 1 for pulling in air from a remote location, a cleaning section 2 for cleaning the sampling tube 10 and diffusion scrubber 11 of the capturing section 1, an ion chromatograph 3 for separating and analyzing gas components concentrated by the concentration column 32 during the sampling operation, and a controller 4 for controlling the above sections 1,2,3 and performing display, storage, and evaluation of analysis data.

The capturing section 1 is described below.

The sampling tube 10 is installed at an arbitrary measurement point at a remote measuring area, and takes in air at the measurement point. The sampling tube 10 is connected to the diffusion scrubber 11. An air passage and an absorption passage through which an absorption fluid that absorbs a gas component are provided within the diffusion scrubber 11, the air passage being connected to a trap 12 via a valve 24. The trap 12 serves as a water content trap for leakage of absorption fluid from the diffusion scrubber 11 and for water drops that become attached to the inner wall of the diffusion scrubber 11 during the cleaning operation. The setting up position of the trap 12 is lower than that of the diffusion scrubber 11. The output of the trap 12 is connected to the mass flow controller (MFC) 13. The mass flow controller 13 is provided for the purpose of adjusting the amount of intake by the air intake pump 14, and is set to 0.5 liters/minute during a capturing operation and 5 liters/minute during a cleaning operation (and scrubber drying).

The cleaning section 2 is described below.

The cleaning section 2 is formed by a cleaning fluid (ultra-pure water) 22 for the purpose of cleaning the inside walls of air passage of the sampling tube 10 and the diffusion scrubber 11, a valve 23 which switches the cleaning fluid 22 to either the supply or the drain direction, and a reversible cleaning pump 21 for the purpose of feeding or reclaiming the cleaning fluid 22. When fluid is being passed, the valve 23 and the valve 24 are at the ON settings as shown in FIG. 1, and the cleaning pump 21 is caused to operate. When the cleaning fluid is to be reclaimed, the valve 23 is switched to the OFF setting as shown in FIG. 1, and the cleaning pump 21 is caused to operate in reverse, so as to perform draining of the fluid.

The ion chromatograph 3 is described below.

In the ion chromatograph 3, an eluent 30 is fed to a concentration column 32, a valve 36, a separation column 33, a suppressor 34, and an electrical conductivity meter 35 by the eluent pump 31. The concentration column (model TCC-LP1, manufactured by Dionex) 32 is known by the disclosure in the Japanese laid-open patent publication (KOKAI) No.8-54380, for example, and serves to concentrate positive ion components within an absorption fluid, a positive ion component separated by the eluent 30 being injected thereby into the separation column 33, this being directly connected by means of the valve 36. The separation column 33 separates positive ion components injected from the concentration column 32 into ammonia ions, monoethanol ions and other ions. The suppressor 34 is used for reducing the electrical conductivity background of the eluent. The electrical conductivity meter 35 measures the electrical conductivity of the eluent 30, which includes positive ions separated by the separation column 33.

Finally, the controller 4 has the function of controlling the valves 23, 24, and 36, as well as the cleaning pump 21, the absorption fluid pump 15, the eluent pump 31, and the air pump 14, and further has the function of capturing the analog output of the electrical conductivity meter 35 and performing conversion to a concentration of a gas component.

A method of performing analysis of a trace-level gas according to the present invention is described below in terms of the operational sequence illustrated in FIG. 2, with reference to the various flows of air, cleaning fluid, absorption fluid, and eluent shown in FIG. 3 through FIG. 6.

The cleaning operation is described below, with reference made to FIG. 2 and FIG. 5.

First, after the start of a measurement, cleaning is performed of the sampling tube 10 and diffusion scrubber 11 of the capturing section 1. This operation is performed so as to prevent the problem that, when the trace-level gas analysis apparatus is stored, if there is contamination of the capturing section 1 by gaseous matter or particles, this contamination will cause measurement errors or failure of the apparatus.

The operation of the various valves and pumps is described below, with reference made to FIG. 1 and FIG. 5.

In order to clean the sampling tube 10 and the diffusion scrubber 11, the air pump 14 is stopped. To supply cleaning fluid 22 to the sampling tube 10 and the diffusion scrubber 11, the valve 23 and the valve 24 are set to the ON side, and the cleaning pump 21 is caused to operate. It is possible to set the total amount of fluid to be fed in accordance with the length of the sampling tube 10 priorly set as a parameter of the apparatus. By feeding cleaning fluid 22 to the sampling tube 10 and the diffusion scrubber 11, it is possible to clean away particles and water-soluble gases that have become attached to the inner walls thereof. When this is done, the absorption fluid 16 is supplied to the diffusion scrubber 11 via a porous fluoride-based film and drained off via the valve 36 by using the absorption fluid pump 15. The eluent 30 remaining in the valve 36, the concentration column 32, separation column 33, the suppressor 34, and electrical conductivity meter 35, is drained off, thereby ejecting the ion components trapped in the concentration column 32 and the separation column 33 in the previous measurement.

The reclaiming and drying of the cleaning fluid is described below, with references made to FIG. 2 and FIG. 6.

In the cleaning operation, in order to reclaim cleaning fluid supplied to the sampling tube 10 and the diffusion scrubber 11, the cleaning pump 21 is caused to operate in the direction opposite from the direction of operation in the supply mode. When this is done, the valve 23 is set to the OFF side as shown in FIG. 1, so that draining is done therefrom. After this is done, in order to dry water drops of the cleaning fluid remaining in the sampling tube 10 and the diffusion scrubber 11, the valve 24 is set to the OFF side and the air pump 14 is caused to operate, so that air is passed through the inside of the sampling tube 10 and the diffusion scrubber 11 so as to dry these elements. Water drops are collected in the trap 12, so that they do not enter the mass flow controller 13. To improve the efficiency of drying, it is possible to make the set flow amount of the mass flow controller 13 large, so that drying is achieved more quickly. The absorption fluid and eluent are drained off, similar to the cleaning operation.

Figure 3:
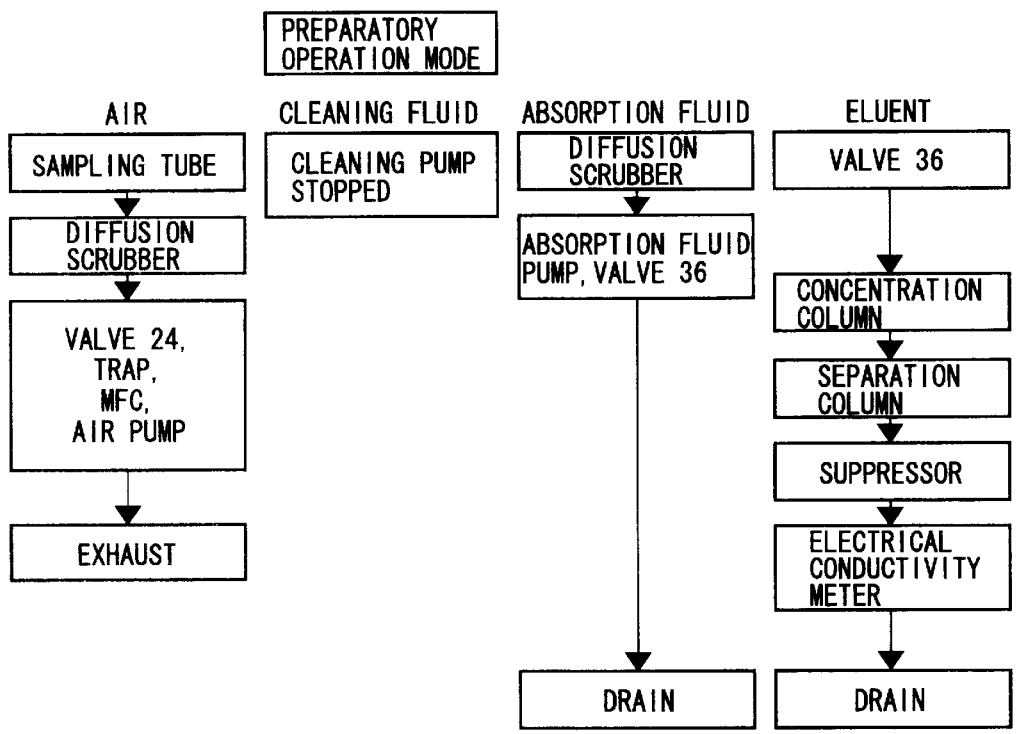
FIG. 3 is a drawing showing the condition in various parts of the present invention during the preparatory operating step.

The preparatory operation is described below, with references made to FIG. 2 and FIG. 3.

This operation is performed for the purpose of stabilizing permeability of a water-soluble gas components when a gas component of air flowing through the diffusion scrubber 11 permeates through the internal porous fluoride-based film and dissolves into the absorption fluid 16. When this is done, an amount of air set by the mass flow controller 13 is taken in. The absorption fluid 16 and eluent 30 are drained off, similar to the cleaning operation.

Figure 4:
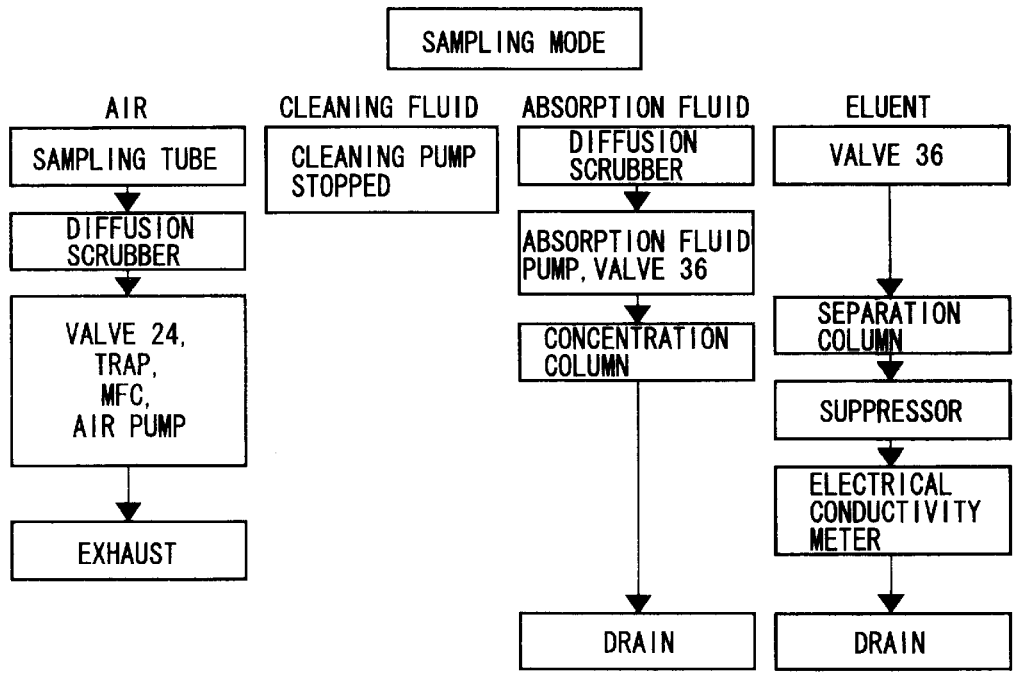
FIG. 4 is a drawing showing the condition of various parts of the present invention during the sampling operation.

The sampling operation is described below, with reference to FIG. 2 and FIG. 4.

This operation is one in which gas components absorbed by the absorption fluid 16 within the diffusion scrubber 11 are concentrated in the concentration column 32. The air absorption operation is similar to the preparatory operation. The gas components that were caused to be absorbed by the absorption fluid 16 within the diffusion scrubber 11 are supplied to the concentration column 32 by using the absorption fluid pump 15 via the valve 36 and drained off via the valve 36. The eluent 30 is pumped by the eluent pump 31 through the valve 36, the separation column 33, the suppressor 34, and the electrical conductivity meter 35, after which it is drained off, thereby ejecting the ion components remaining in the separation column 33.

Separation and analysis are described below, with references made to FIG. 2, FIG. 5 and FIG. 6. The separation and analysis operations are similar to the above-noted cleaning and cleaning fluid reclaiming operations. In order to dissolve out and separate a gas component that has been concentrated in the concentration column 32 during the sampling operation, the eluent 30 is supplied to the concentration column 32 in the direction opposite the direction during the sampling operation. The ion components are separated by the separation column 33, and the suppressor 34 then reduces the electrical conductivity background, after which the electrical conductivity meter 35 measures the electrical conductivity of the dissolved out ion components with a time difference therebetween, an analog signal corresponding to the electrical conductivity value being sent to the controller 4. During the execution of the separation and analysis, cleaning (FIG. 5) of the sampling tube 10 and the diffusion scrubber 11 and reclamation of the cleaning fluid (FIG. 6) therefrom are performed, so as to shorten the measurement cycle.

The controller 4 controls the valves 23, 24, and 36, the cleaning pump 21, the absorption fluid pump 15, the eluent pump 31, and the air pump 14, and captures the analog output from the electrical conductivity meter 35 and performs data processing of a conversion from the captured data to a gas component concentration.

The controller 4 additionally performs control of the cleaning operation and the cleaning fluid reclamation operation during the period in which the separation and analysis are being performed. That is, the time settings of the various operating modes are made so that the following condition is maintained.

(Separation/analysis operation time)=(Cleaning operation time)
+(Cleaning fluid reclamation operation time)

As shown in the flowchart of FIG. 2, if the operating times are set and control is performed so as to satisfy the above-noted condition, it is possible to shorten the length of time required for one measurement.

Figure 7:
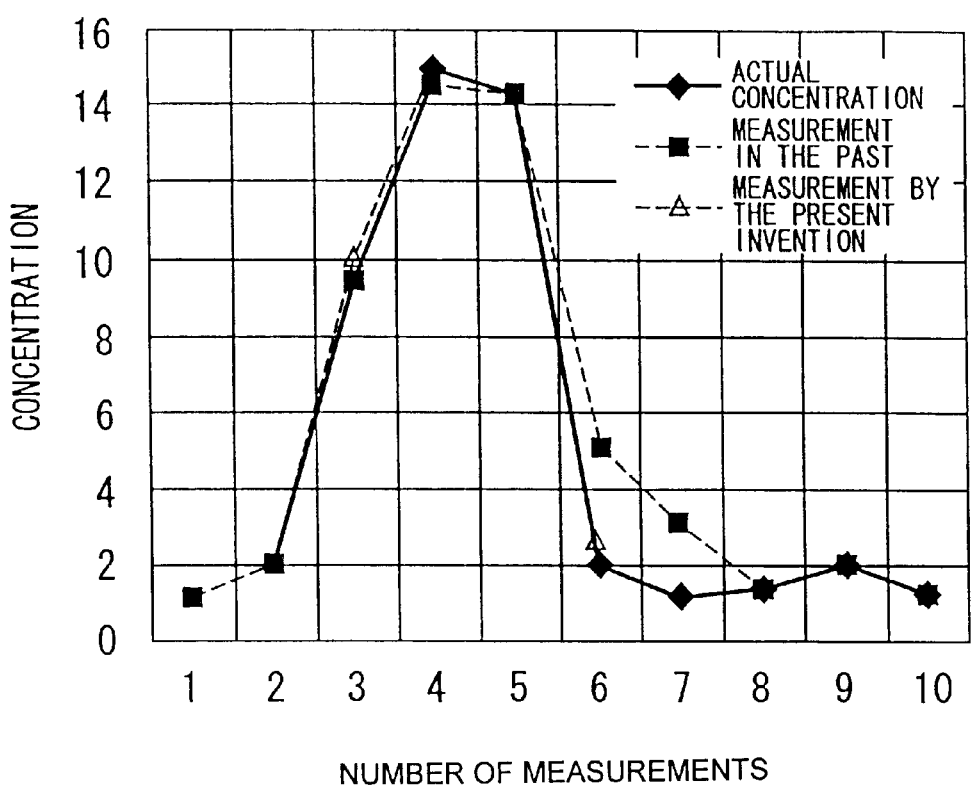
FIG. 7 is a graph showing the results from a trace-level gas analysis apparatus according to the present invention in comparison with measuring results obtained from an apparatus of the past.

FIG. 7 is a graph that presents a comparison between the measurement results obtained by an apparatus of the past and the measurement results obtained by an apparatus according to the present invention, from which it is clear that the measurement results from the apparatus of the present invention indicate the actual concentration.

As described above, a trace-level gas analysis method according to the present invention is a method for analyzing trace-level gas components of the air, in which the air is guided to a diffusion scrubber via a sampling tube, an absorption fluid is introduced into the diffusion scrubber, the absorption fluid being concentrated by a concentration column of an ion chromatograph, thereby separating and analyzing the atmospheric trace-level gas components, the method comprising steps of: a first step of cleaning the diffusion scrubber and the sampling tube; a second step of reclaiming the cleaning fluid used in the first step; a third step of causing an absorption fluid to circulate within the diffusion scrubber so as to stabilize capturing in the diffusion scrubber; a fourth step of causing an absorption fluid to circulate between the diffusion scrubber and the concentration column, so as to concentrate the trace-level gas components in the concentration column; and a fifth step of analyzing components concentrated in the concentration column using an ion chromatograph.

In particular, in the present invention the cleaning and reclaiming steps are performed simultaneously with the analyzing step.

Second Embodiment

Figure 8:
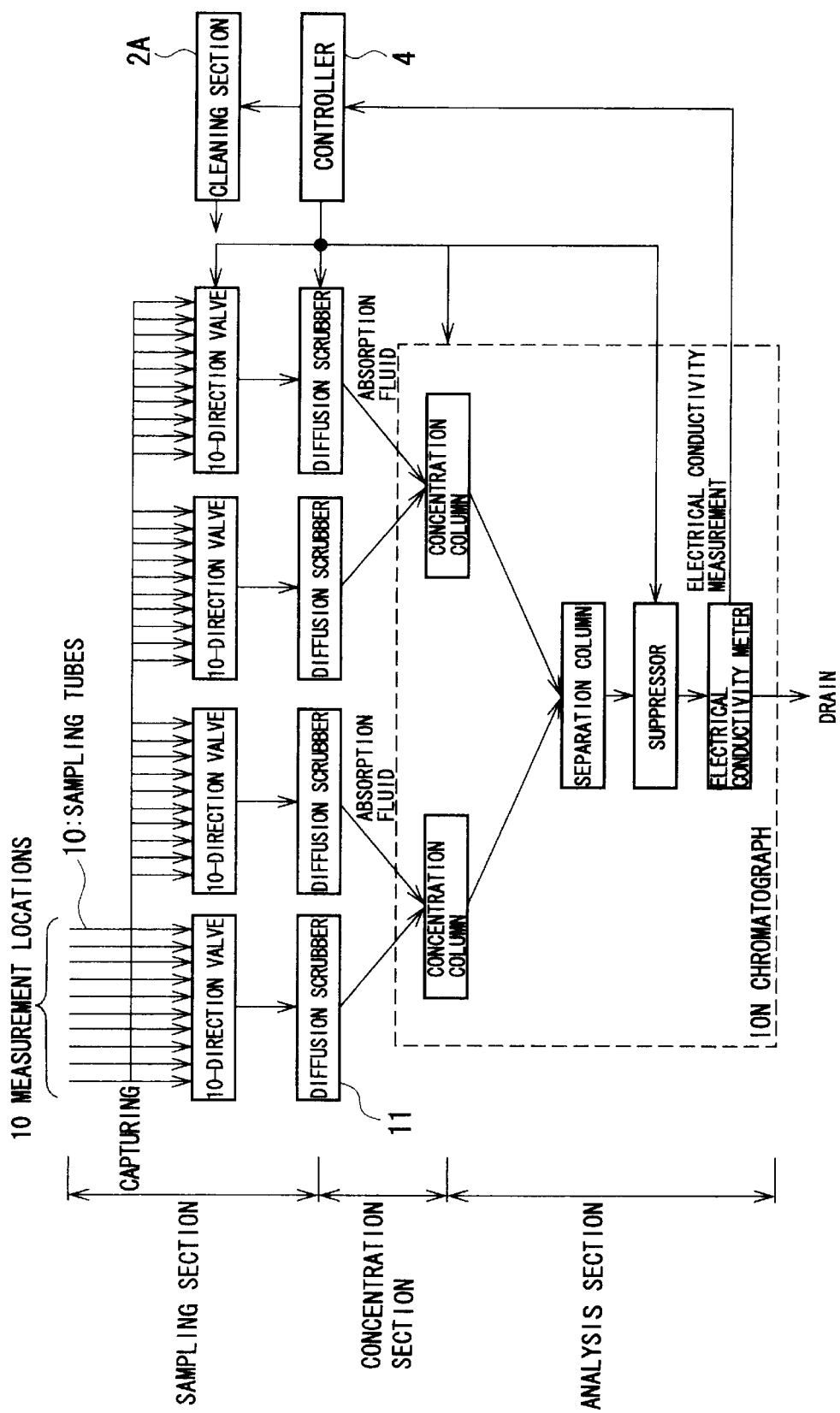
FIG. 8 is a drawing showing the configuration of another example of the present invention.
Figure 9:
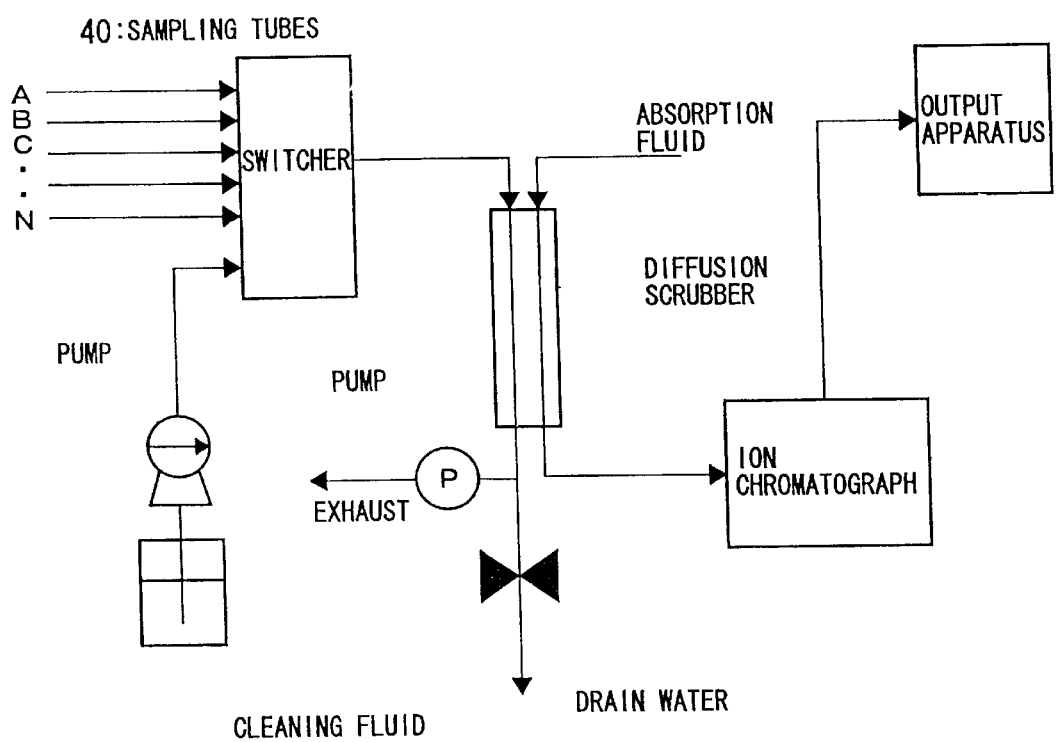
FIG. 9 is a drawing showing the configuration of a trace-level gas analysis apparatus of the past.

FIG. 8 is a block diagram showing the configuration of a trace-level gas analysis apparatus according to a second embodiment of the present invention. This embodiment is described below for an example in which there are 10 locations at which an atmospheric trace-level gas is captured, in which four sampling and concentration sections and two concentration columns are provided, and in which a single ion chromatograph is used as the analysis apparatus.

As shown in FIG. 8, four 10-direction switching valves are installed, to which 10 sampling tubes are connected in common, so that each of the sampling tubes is installed at the measurement locations. The 10-direction switching valves select one location from 10 locations for capture of an atmospheric trace-level matter and intake collected air therefrom. The four groups of 10-direction valves are controlled so as to select mutually different air collection locations. Two concentration columns are provided, and absorption fluid that includes trace-level matter absorbed in the diffusion scrubber is caused to circulate and flow through the diffusion scrubber and the concentration columns, so as to cause the concentration thereof in the concentration columns. The separation column trace-level matter injected from the concentration column by an eluent into individual substances, which are separately analyzed by the ion chromatograph.

In FIG. 8, the reference numeral 2A, similar to the case of the first embodiment, denotes a cleaning section, which cleans the sampling tube, the 10-direction switching valves, and the diffusion scrubbers, and in FIG. 8 the cleaning section 2A is configured so as to clean all four groups. It will be understood, however, that it is alternately possible to provide a cleaning section individually for each group.

The cleaning operation is performed as is appropriate.

The invention can also be applied to other methods, such as the denuder method or the impinger method.

By adopting the technical constitutions described in detail above, an apparatus and method for analysis of trace-level gases achieves a number of effects.

The first effect is that of reducing the memory effect. For example, as shown in FIG. 7, in the case in which a high-concentration contamination occurs, in the past a high-concentration component becoming affixed to the diffusion scrubber or sampling tube, thereby resulted in values higher than the actual concentration being detected on the next measurement. With the present invention, however, as indicated by the piping interconnections of FIG. 1 and the flowchart of FIG. 2, a cleaning section is provided so as to clean away the measured components of the previous measurement, so that an accurate measurement is possible each time, without an influence from a high-concentration components of the previous measurement.

The second effect is that measurement time of the present invention is very short, even though the cleaning operation includes.

What is claimed is:

1. A trace-level gas analysis apparatus comprising:
   a diffusion scrubber for capturing an atmospheric gas component;
   a sampling tube for guiding said captured atmospheric gas component to said diffusion scrubber; and
   cleaning means for cleaning said diffusion scrubber and said sampling tube using a cleaning fluid, wherein said cleaning fluid is ultra pure water.

2. A trace-level gas analysis apparatus according to claim 1, said apparatus further comprising:
   a pump for introducing said cleaning fluid into said diffusion scrubber and sampling tube and discharging said cleaning fluid from said diffusion scrubber and said sampling tube; and
   a valve for guiding said cleaning fluid to said diffusion scrubber and said sampling tube and draining out spent cleaning fluid therefrom.

3. A trace-level gas analysis apparatus according to claim 1, said apparatus further comprising:
   a plurality of sampling tubes for capturing atmospheric gas components at a plurality of locations; and
   a switching valve disposed between said plurality of sampling tubes and said diffusion scrubber so as to select any one of said sampling tubes.

4. A method for analyzing trace-level gas components of the air, in which said air is guided to a diffusion scrubber via a sampling tube, an absorption fluid is introduced into said diffusion scrubber, said absorption fluid being concentrated by a concentration column of an ion chromatograph, thereby separating and analyzing the atmospheric trace-level gas components, said method comprising the steps of:

cleaning said diffusion scrubber and said sampling tube;

reclaiming said cleaning fluid used in said first step;

causing an absorption fluid to circulate within said diffusion scrubber so as to stabilize capturing in said diffusion scrubber;

causing an absorption fluid to circulate between said diffusion scrubber and said concentration column, so as to concentrate said trace-level gas components in said concentration column; and analyzing components concentrated in said concentration column using an ion chromatograph.

5. A method for analyzing trace-level gas components of the air according to claim 4, wherein in said analyzing step, said cleaning step and reclaiming step are performed simultaneously.

6. A method for analyzing trace-level gas components of the air according to claim 4, wherein cleaning step is performed using ultra-pure water.

* * * * *